Feb. 24, 1970  D. W. GARNETT  3,497,022
ELECTRONICALLY CONTROLLED WEIGHING APPARATUS
Filed May 24, 1967  5 Sheets-Sheet 1
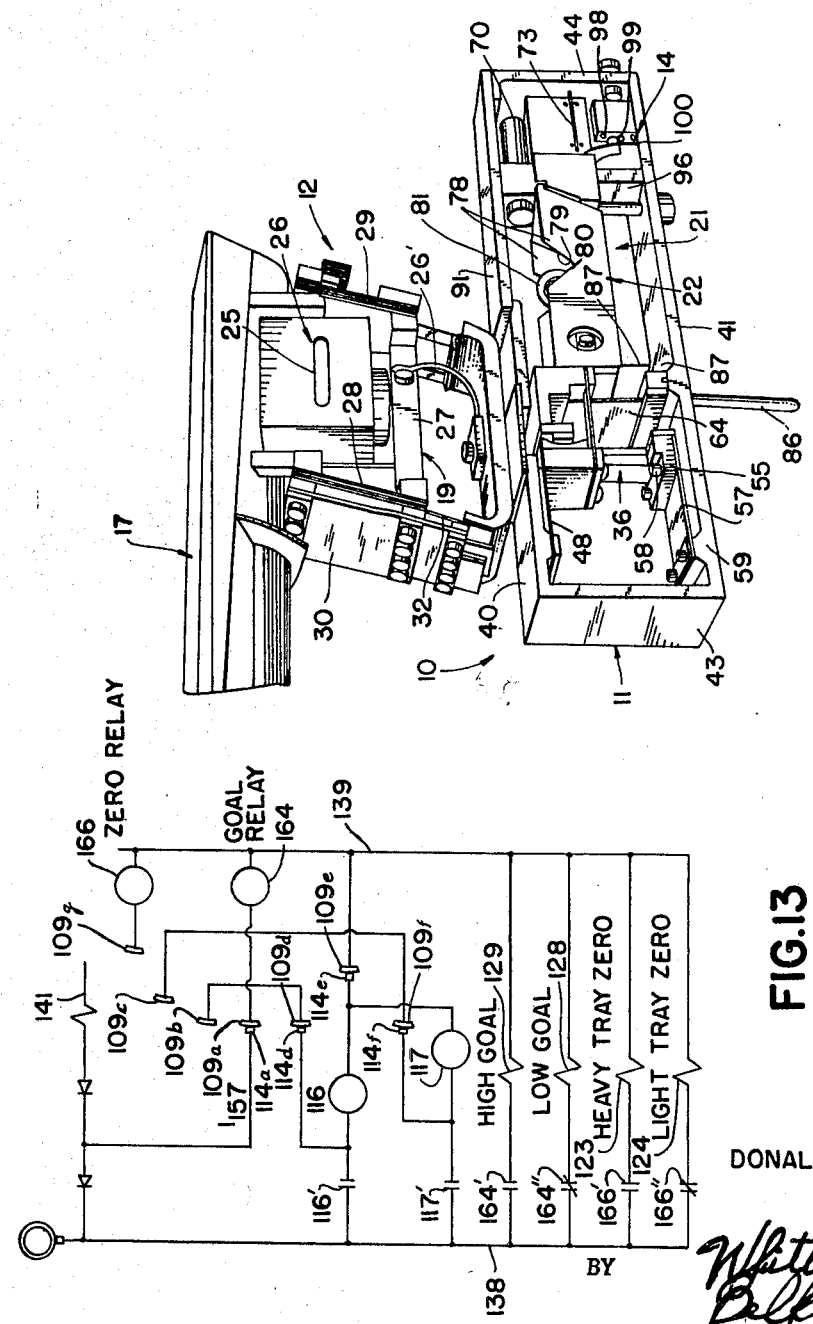
INVENTOR
DONALD W. GARNETT
BY
Whittemore, Hulbert
Belknap
ATTORNEYS

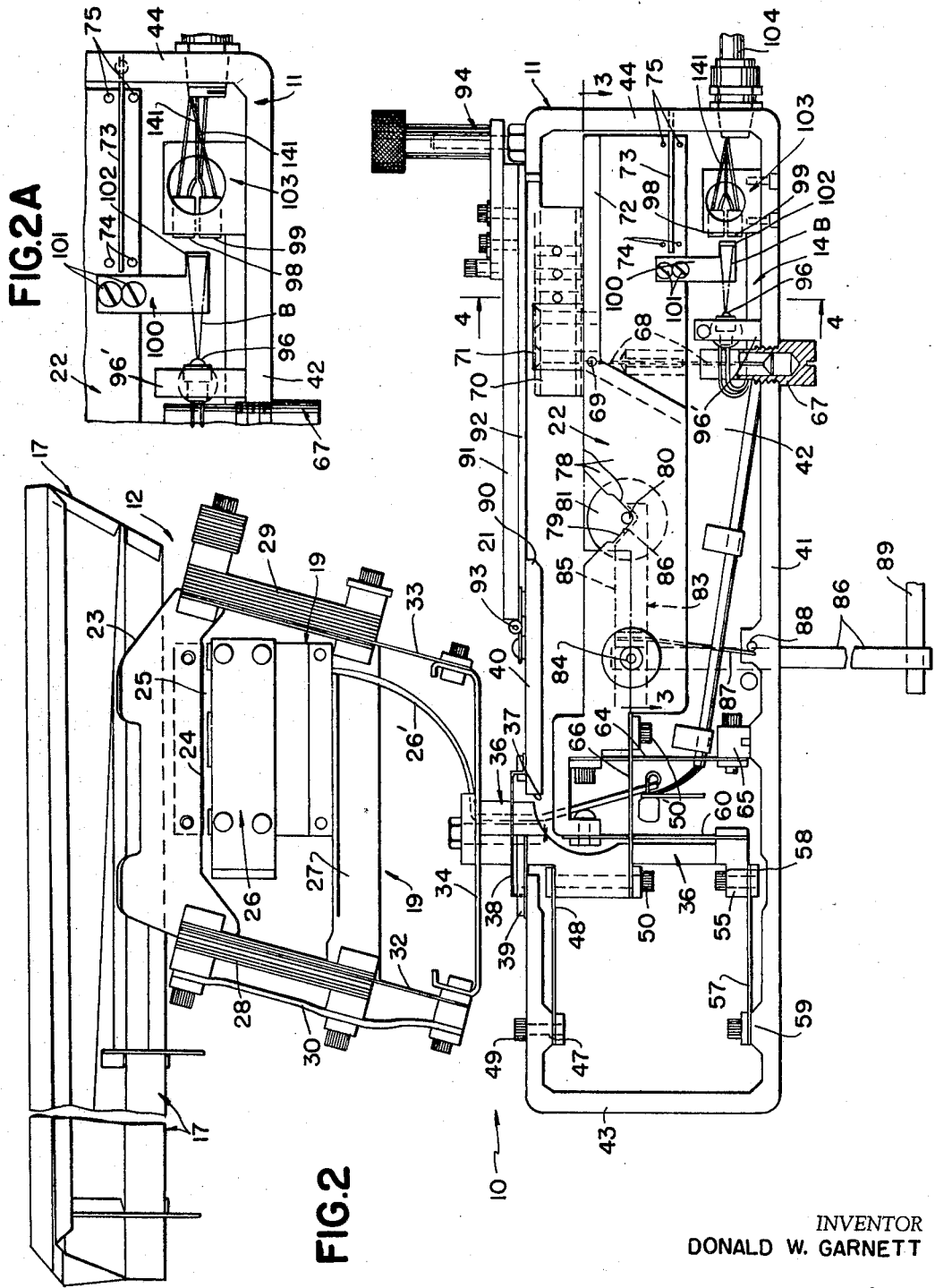

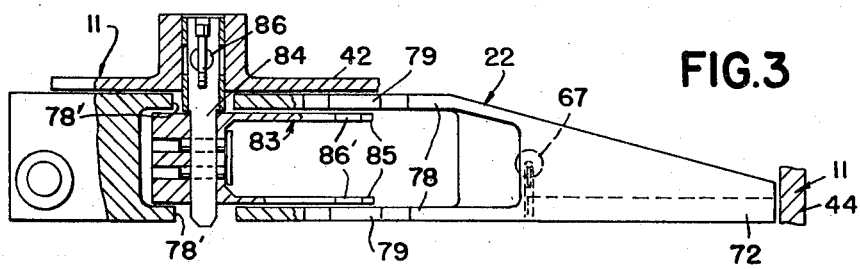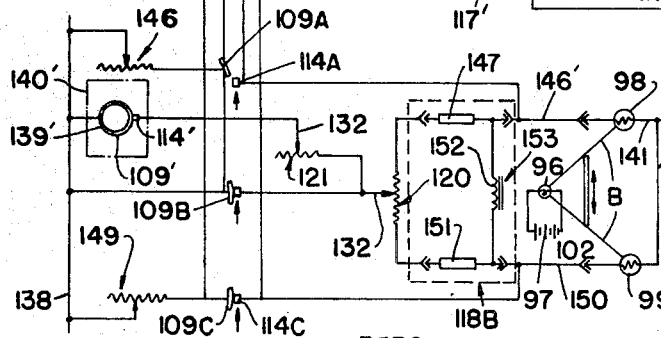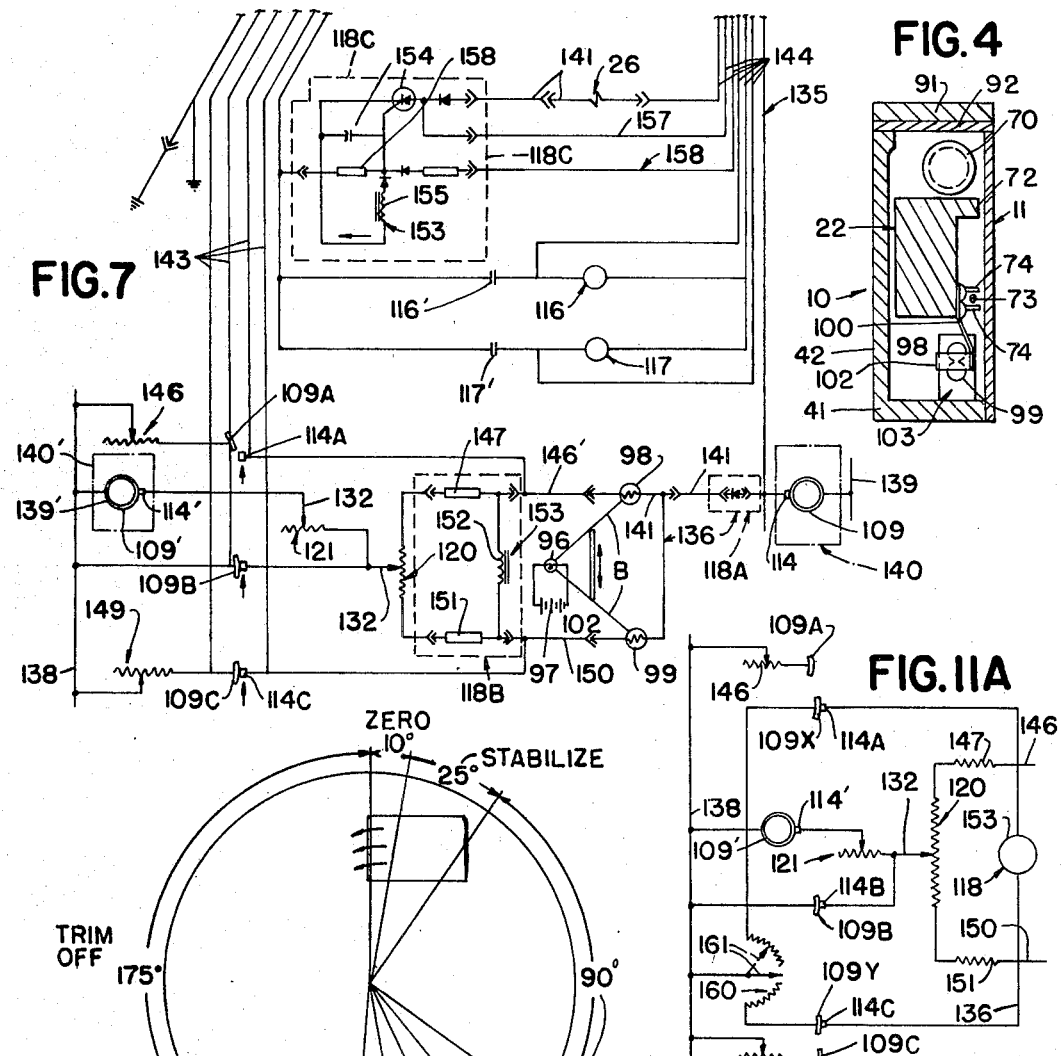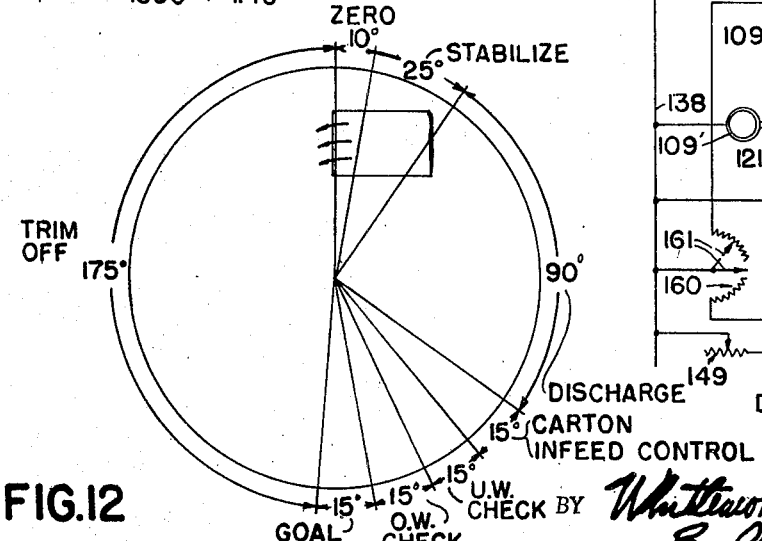
Feb. 24, 1970    D. W. GARNETT    3,497,022
ELECTRONICALLY CONTROLLED WEIGHING APPARATUS
Filed May 24, 1967    5 Sheets-Sheet 3
INVENTOR
DONALD W. GARNETT
ATTORNEYS

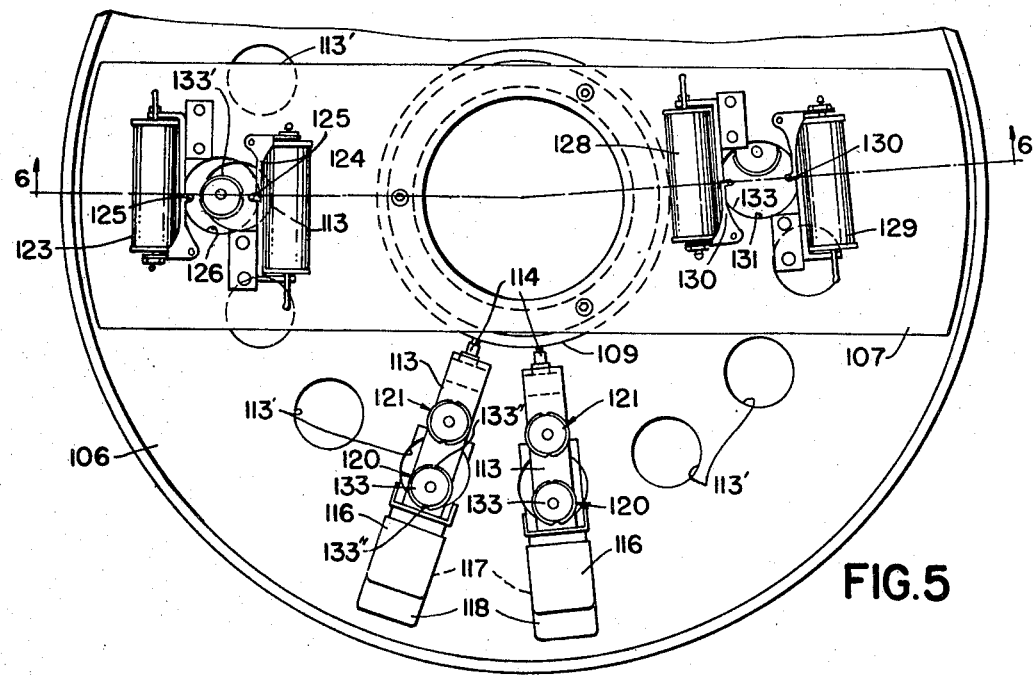
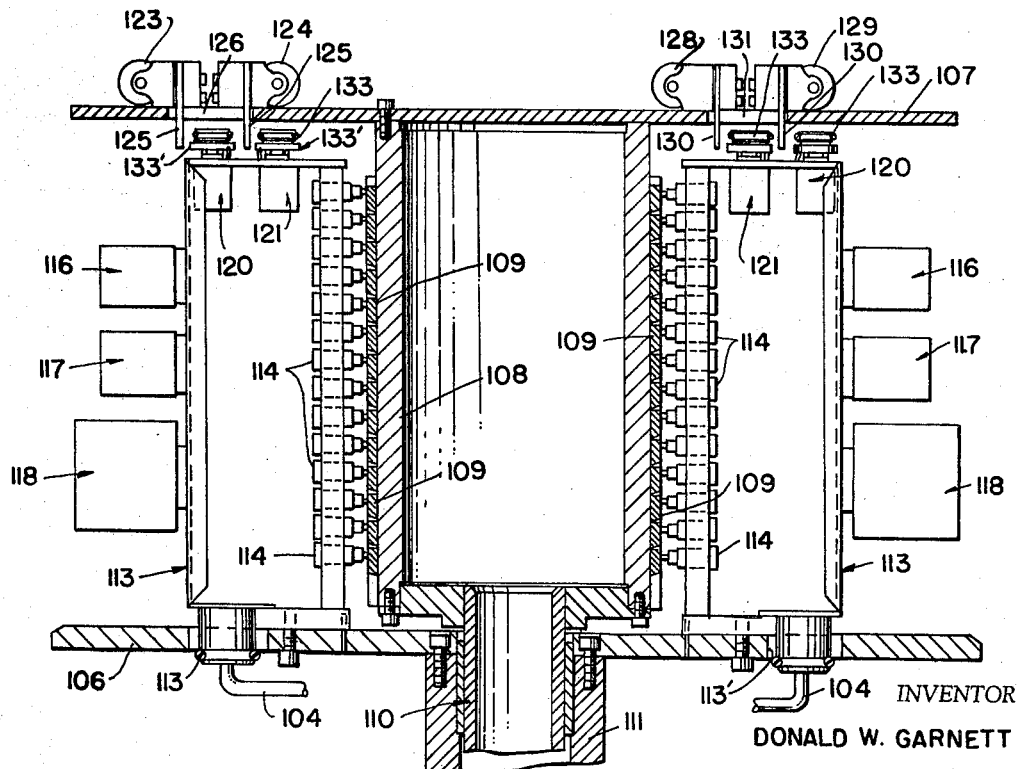

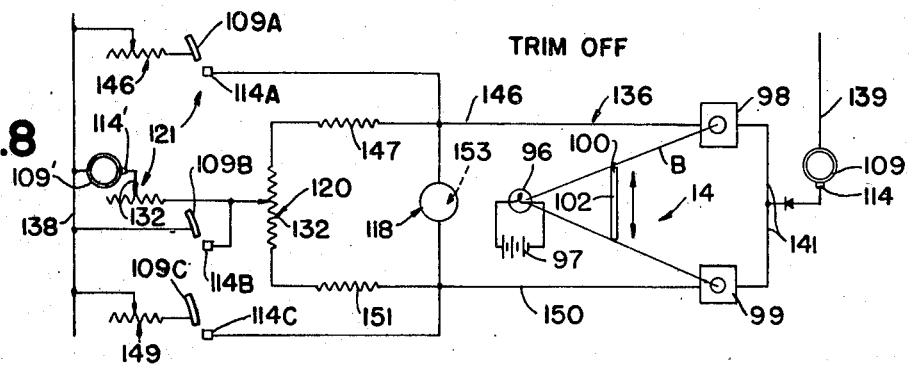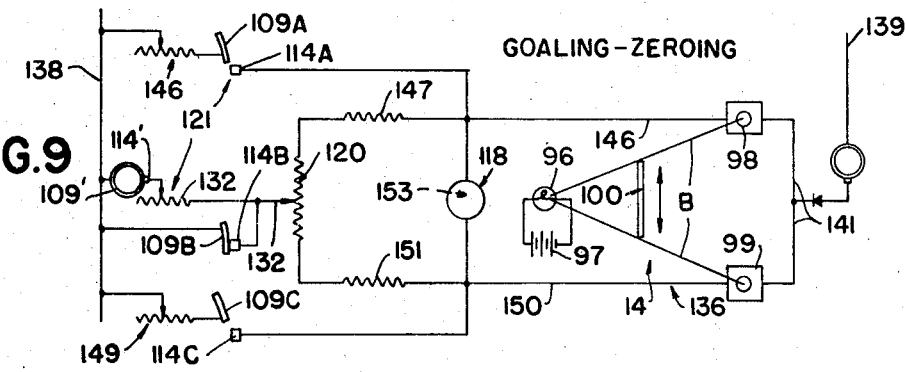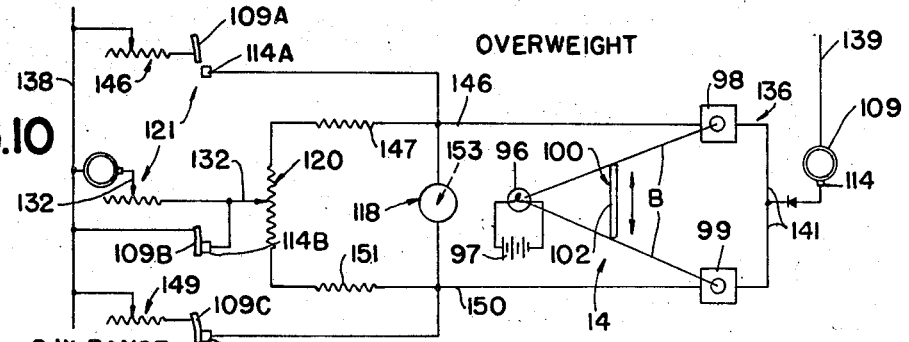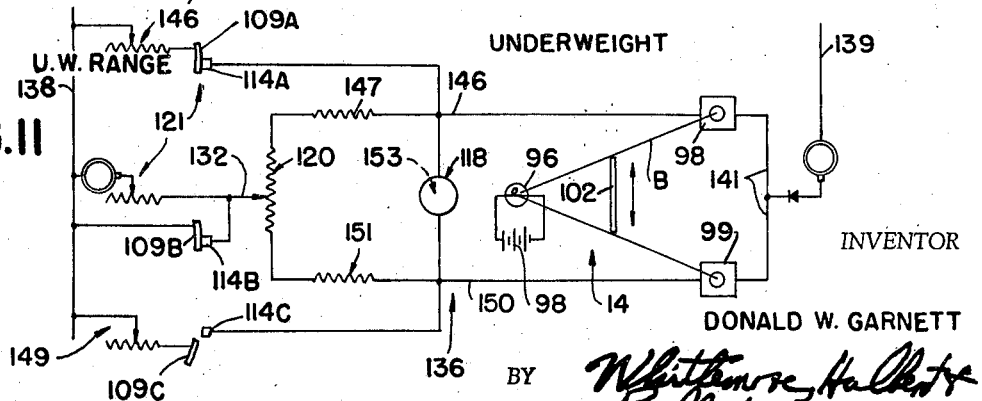

United States Patent Office 3,497,022
Patented Feb. 24, 1970

3,497,022
ELECTRONICALLY CONTROLLED WEIGHING APPARATUS
Donald W. Garnett, Grand Ledge, Mich., assignor to The Olofsson Corporation, Lansing, Mich., a corporation of Michigan
Continuation-in-part of application Ser. No. 462,674, June 9, 1965. This application May 24, 1967, Ser. No. 640,912
Int. Cl. G01g 23/18
U.S. Cl. 177—45        22 Claims

ABSTRACT OF THE DISCLOSURE

A system of leaf springs floatingly mounts a scale beam of a rotary weigher head, the beam being equipped with a master weight periodically lifted from the beam in a scale zeroing phase. The beam performs a zeroing adjustment of its balance through the agency of electronic means, including a light source, a pair of sensing photo-tubes and a mask carried by the scale beam, the photo-tubes being wired into a basic circuit of the weigher in such manner that the weigher beams are automatically conditioned as to balance in their rotating cycle, under the control of commutator means.

---

The present application is a continuation-in-part of my co-pending application on a "Weigher Head," Ser. No. 462,674, filed June 9, 1965, now Letters Patent No. 3,369,620 of Feb. 20, 1968.

CROSS REFERENCES TO RELATED APPLICATIONS

In addition to my Patent No. 3,369,620, the improved weigher head is well adapted for utilization in a rotary weighing apparatus such as is the subject matter of my copending application, Ser. No. 409,503, filed Nov. 6, 1964, now Letters Patent No. 3,339,651 of Sept. 5, 1967. The improvement presents advantages over the head of those patents also, in regard to mechanical scale biasing means and the elimination of electrical contacts within the weighing head.

BACKGROUND OF THE INVENTION

Field of the invention

High speed rotary weighing machines equipped with an annular series of, say, 15 or more weighing heads are used in the precision weighing of many products of widely differing nature, for example, potato chips, powdery material, frozen foods, non-edible objects supplied in bulk, etc.; and this is the field which the improved head will occupy. High precision operation is of the essence, since a day's run of overweight charges will be unacceptably wasteful, dollar-wise, while underweight charges, as in the case of foodstuffs particularly, are illegal. Otherwise, the field of the invention is described in my patents identified above, as well as in patents granted to my assignee on generally similar weighing apparatus.

Description of the prior art

The patents last referred to in the preceding paragraph which are the most pertinent of which I am aware are Garnett et al., 3,094,182 of June 18, 1963, and Olofsson et al., 3,156,311 of Nov. 10, 1964. These show high speed weighing machines and, in particular, 3,156,311 discloses a weigher head in which a zeroing operation is performed to particularly adjust the balance of a scale bean supporting a vibratory weigher receptable, as by the motorized adjustment of an eccentric weight on the beam. My Patents 3,339,651 and 3,369,620, achieve the same result by varying the bias of a spring applied to the beam; and also shows means to perform a goaling adjustment, but by resort to electrical contacts within the weigher head, the need for which the present invention eliminates.

SUMMARY OF THE INVENTION

As indicated above, the floating, leaf spring-maintained scale beam of the present head carries a shadow clip which, moving with the beam, variably masks inversely a pair of photo-electric cells or photo tubes, except rarely when the system is in perfect balance and the tubes are equivalently masked. The output of the photo tubes is connected to what is essentially a simple bridge circuit featuring certain variable resistances, including automatic potentiometers and manual rheostats, with a transformer coupled amplifier connected across two legs of the bridge and adapted to fire when the unbalance of the bridge exceeds a predetermined voltage level. The variable resistances are energized in each rotative cycle of the weigher head through the agency of fixed commutator rings or segments electrically connected to the voltage source of the circuitry, and brushes rotating with the platform of the weigher which carries the circumferential succession of improved weigher heads.

Also rotating with the platform and brushes are the potentiometers mentioned above, which periodically come under energization from the commutator means, and thereby make adjustments in the zeroing and goaling ranges. For the purpose, the contactors of the zeroing and goaling rheostats rotating with the platform are equipped with rubber tired wheels to drive the contactors thereof in one direction or another; and pairs of solenoids fixedly mounted on the superstructure of the machine are energized to position the armatures thereof for engagement by the potentiometer wheels in the rotation of the latter, as the need for correction of the resistance of the controlling bridge circuit arises in the operation of the machine.

BRIEF DESCRIPTION OF THE DRAWINGS

FIG. 1 is a perspective view of the improved weigher head, and the vibratory receptacle structure supported by the scale beam of the head, a near side wall of the housing of the head being removed to expose its interior;

FIG. 2 is a side elevational view, partially broken away, of the head, and in section, more clearly showing the components within the head;

FIG. 2-A is a fragmentary enlarged scale view of the electronic photo tube unit within the head housing, and the scale-borne shadow clip which variably masks the two photo cells of the unit;

FIG. 3 is a view in horizontal section on line 3—3 of FIG. 2, a scale beam master weight being removed;

FIG. 4 is a view in transverse vertical section on line 4—4 of FIG. 2;

FIG. 5 is a fragmentary top plan view of the commutator brush, relay, amplifier and solenoid-controlled potentiometer means of the weighing machine of which the improved head is a part;

FIG. 6 is a fragmentary view in vertical section on line 6—6 of FIG. 5;

FIG. 7 is a schematic wiring diagram which shows such portion of the commutator-controlled circuitry as is germane to the operation of the bridge circuit in various phases of the weighing cycle;

FIGS. 8, 9, 10 and 11 are, respectively, much simplified wiring diagrams of the bridge circuit, of which there is one for each head, and its condition in trim-off, goaling and zeroing check, overweight check and underweight check phases of the weighing cycle;

FIG. 11A is a diagram similar to FIGS. 8–11, showing an optional conditioning of the bridge circuit to electrically enable an alteration, in effect, of the zeroing weight in special instances;

FIG. 12 is a schematic layout showing the approximate duration in degrees of various phases of a complete 360 cycle rotation of the weigher platform; and FIG. 13 is another schematic layout relating to the circuit condition in goaling, zeroing and overweight-underweight checks.

DESCRIPTION OF A PREFERRED EMBODIMENT

The improved weigher head of the invention is generally designated by the reference numeral 10. It is rotated horizontally at high speed with other like heads of an annularly spaced series of, say, fifteen or more, in the manner described in the patents mentioned above. Head 19 comprises, as best shown in FIG. 2, an elongated rectangular, well sealed box-like housing or casing 11 of aluminum, within which a scale beam structure (to be described) supports from beneath a vibratory tray or pan assembly, generally designated by the reference numeral 12.

Associated with and in each weigher head 10 is an electronic device, generally designated 14, which (with its circuitry to be described) performs the functions of the zeroing unit and goal weight seeking and adjusting unit of my patents identified above.

The vibratory weigher unit 12 is structurally very similar to the corresponding unit of my Patent 3,369,620. It comprises an elongated tray or pan 17 extending radially of the rotative path of the weighing heads, and the weighed contents of this receptacle are vibratorily dribble fed-off or trimmed-off during the tray travel to proper weight, then vibratorily dumped completely in a more rapid and violent way in a discharge area.

The pan 17 is supported by a known type of electromagnetic vibrator unit, generally designated 19, and the unit 19 is in turn supported by the leaf spring balanced or floated scale beam structure of the invention, as mounted within the housing 11 and generally designated by the reference numeral 21, said structure including a front-to-rear elongated beam 22 which mounts a masking member of the electronic device referred to above and later described in detail.

Typically, the vibratory unit 19 is shown as comprising a horizontal top support 23 on which the pan or receptacle 17 is fixedly secured, the support 23 fixedly carrying on its bottom an electromagnetic armature plate 24 of substantial size. A small air gap 25 exists between the armature plate 24 and an electromagnet field coil 26 directly therebeneath, which is supported upon an intermediate cross member 27 of unit 19 paralleling its top support 23. In use coil 26 is energized by a rectified pulsatory voltage through leads 26′.

The upper and lower supporting members 23, 27, respectively, of vibratory unit 19 are fixedly connected at their ends to one another by pairs of upwardly inclined, laminated fiberglass leaf springs 28, 29, with an upright strap device 30 adjacent the forward pair to stabilize the vibratory throw of receptacle 17.

As thus spring-interconnected, the supports 23, 27 are resiliently secured by a pair of upwardly inclined front and rear isolation leaf springs 32, 33, respectively, to a bottom cross member 34 of the vibratory unit 19. This member is, in its turn, fixedly secured by a bolt to an upright stem member 36, with which the beam 22 is floatingly associated as part of the scale beam structure 21. The stem 36 extends downwardly through an opening 37 in the top wall of housing 11, and is sealed about this opening, as by a flexible diaphragm type of seal 38, fixedly mounted by a clamp ring 39 to the housing, to prevent entry of dust or foreign matter to the interior of the housing.

The weigher head housing 11, like those of my Patents 3,339,651 and 3,369,620 mentioned above, includes top and bottom walls 40, 41, respectively, in the former of which the opening 37 is provided, side walls 42 and opposed, radially outer and inner, or front and rear, end walls 43, 44. The walls 40 and 41 are formed to provide certain integral internal projections or bosses providing anchors for some of the leaf spring type beam mounting or balancing members of the invention, as will be described. The receptacle supporting stem 36 extends downwardly almost to the bottom housing wall 41.

Top housing wall 40 is provided adjacent its radially outer end wall 43 with a thickened integral boss 47, at which a first horizontal leaf spring 48 is secured by a screw 49. The spring 48 extends inwardly or towards the rear, where its opposite end is fixedly connected to the stem member 36, as by means of a long upright screw 50, which screw also secures an end of another leaf spring, to be described.

The housing 11, encasing electronic means as it does, has no need for spring-type scale biasing means according to my earlier Patent 3,369,620 showing a generally similar leaf spring structure. This is emphasized in FIG. 2 by an indication in dot-dash line that an anchoring boss (52) for such scale biasing means is not present.

A bottom offset 55 on stem 36 has the free end of a second horizontal leaf spring 57 secured thereto, as by a screw 58, and the opposite end of spring 57 is anchored at the left to an integral internal boss formation 59 of bottom housing wall 41.

Next, the upright leaf spring 60 is fixedly secured at its bottom end to the side of upright stem 36 opposite the latter's offset 55; and a second upright leaf spring 64 paralleling leaf spring 60 is fixedly anchored at its lower end to a bottom wall boss 65. The upper ends of the leaf springs 60 and 64 are fixedly connected to a forward, downwardly hooked end of beam 22 of the scale beam structure 21. Finally, this forward beam end is coupled to the receptacle mounting stem 36 of the scale beam structure, as by a horizontal leaf spring 66 connected to the stem by the screw 50, and to the beam by another screw 50′.

Actually, the spring 66 is primarily for the purpose of affording stability to a beam and receptacle structure otherwise connected by the sets of parallel arm, horizontal and vertical leag springs 48, 57 and 60, 64, respectively, both in the horizontal transverse direction across the housing walls 42 and in the longitudinal direction of beam 22; and, absent any need for such stabilizing effect, the spring 66 may possibly be omitted.

As shown in the figure, the intermediate horizontal spring 66 just referred to is in horizontal alignment with the center of gravity of beam 22, as master balanced and counter-balanced in the manner to be described, so that there is no tendency to set up a force moment on spring 66 under the centrifugal effect.

A small hydraulic dash-pot unit 67 is mounted on the bottom wall 41 of housing 11 at a point considerably further to the right (FIG. 2) than in the case of the dash-pot of my earlier Patent 3,369,620. Dash-pot 67 has its plunger rod 68 connected upwardly to a pin 69 located on beam 22 well to the right of a removable masterweight on the latter (to be described). The dash-pot device acts to stabilize the beam in an improved way at a point adjacent its counterweighed tail.

Thus, it is seen that the set of three parallel and horizontal leaf springs 48, 57 and 66 coact with the set of two parallel upright leaf springs 60, 64 in providing a floatingly balanced mount for the scale beam 22 which is sensitive with high accuracy to the changing weight of the vibratory receptacle unit or assembly 12, which is free of possible lost motion or play, such as destroys needed accuracy in bearing-journalled beams as the result of brinelling, and which requires no maintenance or other attention whatsoever following initial assembly.

Structurally, the leaf springs 48, 57, 60, 64 and 66 (and certain others herein mentioned) are by preference constituted of a three-layer laminate of epoxy-impregnated glass fiber filament material, in a thickness of, say, 0.030″, and in a transverse width slightly less than the horizontal spacing between side walls 42 of housing 11. Typically, this will be of the order of two inches.

To permit the intersecting relation of the horizontal stabilizing spring 66 and the upright stabilizing springs 60, 64, the former is made in a rectangular O-shaped outline and the latter are in a rectangular I-shaped outline, with the stems thereof received in the opening of spring 66. The transverse dimensions of the springs 60, 64 and 66 at the ends thereof are equal and of the width mentioned above.

The impregnated fiberglass material for the springs is dimensionally stable, not subject to atmospheric deformation or deterioration, or to a changed set in bias as the result of working or aging. As dimensioned in width and thickness, the leaf springs 48, 57, 60, 64 and 66 provide a highly desirable spring rate, as well as perfect lateral stabilization of the sweep of the scale beam structure 21 in a vertical plane.

The radially rearward or right-hand end of the scale beam 22 (FIG. 2) is appropriately counterpoised by a rather massive, externally threaded horizontal weight 70 mating in a nylon block 71 held downwardly by screws on a rear tail flange 72 of the beam. Adjustable counterpoise 70 balances beam 22 against the weight of the vibratory pan assembly 12, which may vary in some instances. A round wire spring steel leaf spring 73 is fastened to the rear wall 44 of housing 11, projecting horizontally within the latter between pairs of upper and lower stop pins 74, 75 on beam 22 beneath its tail flange 72. These pins, of which the left-hand pair 74 constitute a resilient stop, while the right-hand pair afford a more positive stop, fix the maximum limits of floating shift of the beam, providing a resiliently cushioned, anti-bounce means to damp out a possible and undesirable mechanical back-and-forth shock action of the scale beam 22 in operation.

Intermediate its length, the beam 22 is formed to provide a pair of parallel, transversely spaced arm portions 78, each provided with a V-shaped celft 79; and a small transverse pin 80, upon which a number of removable weights 81 may be removably mounted, normally rests on the bottom of the aligned clefts 79. These weights, as described in my Patent 3,369,620, are selected to aggregate to an exact value as a masterweight the weight of the intended product is to be weighed in pan 17.

As indicated above, the master weight 81 and adjustable beam counterbalance weight 70 are so applied to scale beam 22 that the center of gravity of the latter, as thus weighed, is horizontally aligned with the stabilizing spring 66. Hence, there is no effect of setting up a moment arm on the spring 66 under centrifugal force. The line at which the latter intersects the left-hand upright stabilizing leaf spring 60 of connecting stem 36 remains, in effect, horizontally stable, although the springs 60 and 64 will assume a very mild S-shaped outline in action.

Periodically, during a short zeroing phase in the rotative travel of weigher unit 10, masterweight 81 is raised from scale beam 22, on the sprinciple that, as thus relieved of a master counterpoise, the beam should be in exact balance, as between the weight of its vibratory pan assembly 12, including pan or receptacle 17 and vibratory unit 19, and the main beam counterweight 70. However, the accumulation of deposits on the interior of receptacle 17, or other changing electrical of mechanical phenomena mentioned above may prevent the balance, or otherwise disturb a response to beam position.

For the purpose in question, a lifter bell crank, generally designated 83, is pivotally mounted at 84 on the far side wall 42 (FIG. 2) of weigher head housing 11. The bell crank includes lifter arms 85 (FIG. 3) acting between the arms 78 of scale beam 22, and a tappet rod 86 depending from the bell crank pivot externally of the far side housing wall, it being understood that arms 78 of beam 22 will be formed to provide clearance at 78 through which the pivot shaft of bell crank 83 may be received without interfering with the floating movement of the beam. The lifter arms 85 of bell crank 83 are provided with their own small V-shaped clefts at 86′ adjacent their free ends, whereby counterclockwise swing of the arm will engage the master-weight-mounting pin 80 and lift the weight 81 out of the clefts 79 of the scale beam 22.

The bell crank 83 is urged in the opposite, clockwise direction by an upright leaf spring 87 anchored at its top in relation to lifter arms 85 and engaging at its bottom against a projecting pin 88 on housing side wall 42. Depending substantially beneath the housing 11, the lower end of tappet rod 86 of the bell crank is adapted to periodically engage a fixed plate cam 89 on the weigher to occasion the counterclockwise movement of lifter bell crank 83 against the bias of leaf spring 87. These matters are detailed in my Patents 3,339,651 and 3,369,620 identified above.

In order to permit access to the scale beam master weight unit 81 and other interior components associated therewith, the top wall 40 of the housing 11 is provided with an elongated opening 90 of substantial size, which is normally tightly closed and sealed by a cover plate 91, with an interposed sealing gasket 92, the plate being horizontally pivoted at 93 and provided with a releasable clamp unit 94 at its rear end.

In use, motions of the beam 22 of scale beam structure 21 in response to a changing product weight on weighing pan 17 are delicately sustained and guided by the set of three horizontal leaf springs 48, 57 and 66, and the set of two upright leaf springs 60, 64. Rolling bearings are completely eliminated, together with their tendency to have play or lost motion after a period of time. The epoxy impregnated glass fiber of the springs in question is inexpensive, yet operable under a long period of time without change of flexure rate. Moreover, it is readily possible to tune these springs at initial installation in the weigher head 10, as by an appropriate selection as to their thickness, length and width. As indicated above, they are dimensionally stable under changing atmospheric conditions and throughout their life.

The action of the the leaf spring sets 48, 57, 66 and 60 64, respectively, is similar to that of a parallelogram motion, which, despite the flexible character of the parallelogram arms, is well stabilized, first, by the disposition of the upper and lower leaf springs 48, 57 with their connections to the stem 36 approximately equidistant from the intermediate horizontal spring 66 on opposite sides of the latter, secondly, the vertical stabilization of beam 22 afforded by the upright leaf spring pair 60, 64 and, thirdly, by the substantial lateral width of the several springs transversely of their length, to afford stability against horizontal shift transversely of the housing interior.

As explained above, the intermediate spring 66 also has transverse stabilization effect on the floating beam structure, as well as longitudinal effect.

In all, the accuracy of the combined scale beam structure 21 and the leaf spring provisions which connect it to the stem 36 supporting the vibratory pan unit 19 is insured against all disturbing effects found to arise in previous leaf spring type, rotary turret weighers. The beam 22, as it supports the load at parallel horizontal leaf springs 48, 57, is disciplined by the spring pair 60, 64 against the normal tendency to rise as the result of centrifugal force, hence is subject to no disturbance of its weighing action from this effect.

By the same token, the combination of the leaf spring sets with a mechanical scale beam 12, to which the downward forces of the receptacle unit 19 and of the master weight and counterweight means 81, 70 are applied, in effect, at opposite sides of what would normally represent the fulcrum knife edge of bearing of a mechanically pivoted beam, is such as to be proof against loss of accuracy due to vibration of the rotary structure of the weighing machine as a whole. This is to be distinguished from the vulnerability of previous types of parallel leaf spring-supported weigher units.

FIGS. 2, 2A and 4 illustrate the improved electronic unit 14, by which signals controlling the various zeroing, goaling, underweight and overweight adjustments are originated and forwarded.

A suitable light source in the form of a small lamp 96 is fixedly supported by means of an upright block 96' on bottom wall 41 of housing 11; and the lamp is for simplicity shown in FIGS. 7 through 12 as being electrically supplied by a battery 97. However, the light source will ordinarily be appropriately wire in the overall circuitry of the machine. Normally, with scale beam 22 precisely balanced, and with its respective flexible and fixed pairs of stop pins 74, 75, respectively, being exactly equidistant on opposite sides of the wire spring 73 (the adjustable counterweight 70 having been manipulated to effect this precise balance), the beam B of lamp 96 will be directed exactly centrally between a pair of upper and lower photo-tubes or cells 98, 99, respectively, and the latter are then equally masked by means of a shadow clip 100 secured by screws 101 to a side of beam 22. Clip 100 has a laterally projecting masking element 102 which performs this function; and as clip 100 shifts upwardly and downwardly with the movement of the beam, photocells 98 and 99 of the photo-sensitive unit, generally designated 103, will be unbalanced in regard to electrical energization of the respective light-sensitive electrodes thereof. Leads from the respective photo-sensitive unit 103 are brought out through an appropriate cable 104 secured on rear wall 44 of weigher housing head 11, and are connected in the circuitry of FIGS. 7 through 11 in the manner presently to be generally described.

FIGS. 5 and 6 illustrate features of the commutation control structure of the machine. It includes a rotary platform 106 upon which the circumferential series of weighing heads 10 are mounted for their rotation, in the manner described in the patents referred to above. A fixed top plate 107 spaced substantially above platform 106 carries a depending, cylindrical drum 108; and a vertical series of commutator rings or ring segments 109 are fixedly mounted on the exterior of the stationary drum 108. It will be appreciated that not all of these conductors will be seen in cross section, as depicted in FIG. 6, inasmuch as only certain thereof are of full 360° extent. A fixed tubular column 110 at the base of drum 108 will receive wiring leads (not shown) electrically connected to the several commutator rings or segments 109; and a motor-powered driving column 111 for the platform 106 concentrically surrounds and rotates relative to fixed column 110.

For each of the weigher heads 10 there is an upright chassis or frame 113 fixedly mounted atop the rotary platform 106 in a circumferentially spaced relation of those frames, and each of these chassis 113 supports a series of vertically spaced brushes 114, which bear radially inwardly on the commutation members 109. Cables 104 (see FIGS. 2 and 2A) lead upwardly through access openings 113' in rotary platform 106 to the interior of frames 113, affording wiring connections (not shown in FIGS. 5 and 6) to the brushes 114, as well as to other electrical components. These latter include, for each weigher head, an overweight memory relay 116 an underweight memory relay 117, and a special jack-connected amplifier 118, all fastened as encased units onto the outer side of a frame 113 in the named downward progression. Likewise, each frame carries a radially outwardly located, zeroing potentiometer 120 and a radially inwardly located goaling potentiometer 121. These are of a rotary, 10-turn type and they are hereinafter mentioned in connection with the electrical circuitry of FIGS. 7–11.

Fixed top plate 107 of the commutation and control structure also carries atop the same a pair of zeroing control solenoids 123, 124 (left-hand side of FIGS. 5 and 6), the pivoted arm-type armatures of which depend through an opening 126 in fixed plate 107, presenting armature pins 125 located on either radial side of the rotary path of orbit of the zeroing potentiometers 120. Similarly, on the opposite side of the axis of the commutation means the fixed top plate carries a pair of goaling control solenoids 128, 129 having their armature pins 130 depending through an opening 131 in the top plate 107, and on either radial side of the orbit of the goaling potentiometers 121 of the respective weigher heads 10.

Potentiometers 120, 121 are of a type having a rotatably adjustable contactor 132 (FIGS. 7 through 11); and in order to effect the rotative adjustment of the contactors, each is equipped above its casing with a rubber tired wheel 133. Accordingly, if the electronic unit 14 of any weigher head senses a need for a zeroing or goaling adjustment, one of the zeroing solenoids 123, 124, or one of the goaling solenoids 128, 129, is energized, thus shifting its armature 125 or 130 in one radial direction or the other and into position for its engagement with and operation of a wheel 133 on a rotatably adjustable contactor of a zeroing or a goaling potentiometer 120 or 121, respectively. Each wheel 133 has a fixed cam 133' located beneath it, the cam being provided with diametrically opposite indented seats 133'' into which the armature pins 125 or 130 may engage the wheel 133 for only a limited arc of rotation. Except in the area of the indented seats 133'', the armature pins 125 or 130 are prevented from engaging the wheels, thus mechanically limiting the rotation of wheels 133 to a short increment during any single engagement with the armature pins. Which armature is shifted and in which direction to make a zeroing or goaling adjustment (a "plus" or a "minus" one) is determined by the operation of the electronic unit 14 in the weigher head.

Accordingly, it is seen that the zeroing and goaling potentiometers 120, 121 for the several weigher heads 10, as operated under the control of the respective solenoids 123, 124 and 128, 129, and circuitry including that of unit 14, accomplishes in a purely electrical and electronic fashion everything that is accomplished by the mechanical components, scale beam-carried and fixed contacts, and the like, employed in the apparatus of my Patents 3,339,651 and 3,369,620 identified above.

FIG. 7 of the drawings shows only a sufficient portion of the entire main commutator controlled circuitry 135 for each weigher head 10 to enable an understanding of the operation of a bridge sub-circuit 136 thereof directly associated with the electronic unit 14. Commutator-connected electrical power supply leads are denoted 138 and 139 in FIG. 7; and units 140 and 140' (boxed in dot-dash line) include slip rings 109, 109' and brushes 114, 114', through which sub-circuit 136 is continuously energized, one schematically shown as being connected between lead 139 and a half-wave diode rectifier unit 118A to which input leads 141 to phototubes 98 and 99 are wired.

Similarly, the reference numerals 109A, 109B and 109C specially designate schematically shown commutator segments periodically contacted respectively by rotating brushes 114A, 114B and 114C in the bridge sub-circuit. Actually, the main circuit 135 comprises leads 143 and 144 connected to brushes; however, the simplified version of FIG. 7 has been adapted for the sake of simplicity to tie in with the schematics of FIGS. 8–11, showing the condition of bridge sub-circuit 136 in a number of operational phases.

Rectifier unit 118A is a plug-in type, as are two other units 118B and 118C boxed in dotted line in FIG. 7. Unit 118B incorporates, among other components, the primary winding of a small transformer (later referred to), while unit 118C incorporates the transformer secondary winding. As encased in a single housing, plug-in units constitute the amplifier 118 physically depicted in FIGS. 5 and 6. Upon the building up of a sufficient voltage the amplifier 118 fires, with results hereinafter described.

The bridge circuit 136 is shown in FIG. 7, in regard to the relative position of its commutator segments 109A, 109B and 109C and respective brushes 114A, 114B and 114C, in a condition obtaining in the overweight check phase, also depicted in FIG. 10. In this state, the brush 114A, advancing upwardly in a rotative path, has yet not engaged segment 109A, while the brushes 114B and 114C are in electrical contact with the respective segments 109B and 109C.

Segment 109A is connected through a manually adjustable, underweight check rheostat 146 whose contactor has a terminal at lead 138. Brush 114A connects to one conducting leg 146' of bridge circuit 136 which is included in plug-in amplifier unit 118B, at a point between upper photo-tube or cell 98 and a voltage divider resistor 147.

Similarly, a manually adjustable, overweight check rheostat 149 is connected between commutator segment 109C and lead 138; and the brush 114C engaging segment 109C connects to the other leg 150 of bridge circuit 136, between the lower photo-cell 99 and a second voltage divider resistor 151 which, like resistor 147, is a part of the amplifier unit 118B.

Externally of that unit the bridge legs 146' and 150, through resistors 147 and 151, respectively, are connected to the coil of 10-turn zeroing potentiometer 120, with the contactor 132 of that potentiometer wired to brush 114B and to the coil of the goaling potentiometer 121. The contactor 132' of potentiometer 121 is connected to brush 114' which engages slip ring 140' and which in turn is wired to voltage supply lead 138, as is also the commutator segment 109B. The primary winding 152 of a transformer 153 of amplifier unit 118B (the secondary of which is in unit 118C) is connected across the legs 146', 150 of bridge circuit 136.

As also shown in FIG. 7, the electromagnetic field coil 26, which vibratorily operates the weighing tray or receptacle 17 in the product trim-off and final product discharge phases, is connected to a commutator brush lead 144 to receive a trim-off voltage, under regulation by a silicon controlled rectifier 154 when the voltage in the secondary winding 155 of transformer 153 (in amplifier unit 118C) reaches a value sufficient to open the gate of silicon controlled rectifier 154. In another phase, a lead 157 connects from rectifier 154 to a commutator brush. Voltage divider resistors 158 in unit 118c connect the latter between a commutator brush lead 143 and a brush lead 144 adapted to feed in a fixed gate voltage sufficient to fire amplifier 118 under any weight condition prevailing at tray 17, for the purpose of vibratory discharge of the contents of tray 17. The overweight memory relay 116 and underweight memory relay 117, along with their contacts 116, 117, are connected in parallel between commutator brush leads 143, 144.

The operation of the improved equipment may be summarized, with reference had to FIGS. 8-11, inclusive, considered in conjunction with FIGS. 2, 2A, 5 and 6, as follows:

TRIM-OFF

As the scale beam-supported vibratory trays 17 pass underneath a product stream emanating from a vibratory supply device 160 (schematically shown in FIG. 12), each normally receives an overweight charge of product. The overweight condition of the receiving tray causes a floating movement of the scale beam 22 in such a manner as to move its shadow clip 100 upward (FIGS. 2 and 2A), thus covering more of the upper photocell 98 and exposing more of the lower photo-cell 99 to the beam B from light source 96, these two photo-cells being wired electrically in the bridge circuit 136. In the trim-off phase, none of the respective sets of commutation segments and brushes 109A-114A, 109B-114B, 109C-114C are in contact, as appears in FIG. 8.

Since the exposure of the two photo-cells 98, 99 is unequal, a signal voltage is created in the bridge circuit 136 through the transformer coupled amplifier 118; and this signal causes electrical power to be delivered to the electromagnetic coil 26 of the vibratory trim-off tray 17.

Product is thereby trimmed off of the tray within an arcuate travel of the same approximating 175°, as shown in FIG. 12. As the tray and its content become lighter, the scale beam 22 responds and lowers the shadow clip 100 (FIGS. 2 and 2A), thus exposing more of the upper photo-cell 98 to the light source 96 and covering more of the lower photo-cell 99.

When the shadow clip 100 approaches a position which exposes the two photo-cells equally, their resistance becomes essentially equal. The electrical result within the bridge circuit 136 is a reduction of the signal output of amplifier device 118. The amplifier 118, its transformer 153 approaching null voltage, now turns off the power source 26 to the vibrator tray 17, by failing to open the gate of rectifier 154. Trim-off vibration is dampened to a stop with a slight coast-off of product beyond the electrical shut-off point, leaving a weight of product in the tray 17 near the desired weight. The tray remains at rest through a stabilizer phase (not germane to the invention) and enters a goal or target checkweight range or area in the rotation of the weigher 10.

GOALING

In the goaling check area, per the diagram of FIG. 9, a higher voltage source is fed to the bridge circuit 136 by the shorting out of the potentiometer 121 which was in the trimming circuit described above. Under influence of the higher bridge circuit voltage, a previously weak bridge signal is strengthened. If the weight of the product in the tray 17 is more than the "goal" or "target" weight, the amplifier 118 will turn on at the gate of silicon controlled rectifier 154. Under control of commutator brush lead 157 and relay agencies, hereinafter referred to in connection with FIG. 13, this power is now directed to and operates one of the pair of goal solenoids 128, 129. This goal solenoid is so positioned that, when energized, its armature pin 130 will engage the friction wheel 133 on the individual rotative goaling potentiometer 121, causing adjustment to a less resistive position.

Goaling occurs in an arcuate travel (FIG. 12) amounting to about 15°, and the influence of the goaling adjustment, which occurs on each rotative cycle of each tray 17 and each weigher head 10, will cause the next charge on this particular receiving tray 17 to trim to a slightly lower weight before shutting off, thus seeking a weight more nearly equal to the "goal" or "target" weight.

On the other hand, if the weight of the product in the tray 17 is less than the "goal" weight, the amplifier 118 will not turn on. Under this condition the opposite solenoid 128 or 129 of the goaling pair causes an adjustment of the goaling or "trim-shut-off" potentiometer 121 to a more resistive position. Consequently the next charge on this particular receiving tray 17 will shut off the trim at a slightly higher weight.

OVERWEIGHT CHECK

As the weigher's rotation continues, the tray 17 enters a new range, extending over about 15°, as shown in FIG. 12, wherein the electrical circuits are again modified by the commutator. In this position, as illustrated in FIG. 10, a high resistance value is commutated at manual potentiometer 149 into the bridge circuit 136 in a manner that will slightly unbalance and weaken the bridge signal. If the weight of the product in the receiving tray 17 is excessive, it will still be able to fire the amplifier 118, even with the weakened signal.

Under these conditions, power is directed by the commutator brush lead 157 through the overweight memory relay 116, as the latter locks in until head 10 reaches a charge-reject station, to cause the ultimate rejection of the charge, in one way or another. If the weight of product in the tray 17 is not excessive, the amplifier 118 will not turn on and the charge will be accepted.

UNDERWEIGHT CHECK

As the weigher's rotation continues, the tray 17 successively enters a new area also approximating 15° of travel (FIG. 12), wherein the electrical circuit is again modified by the commutator structure, to the condition as shown in FIG. 11. In this position the second manually adjustable rheostat 149, of high resistance value, is commutated into the bridge circuit 136 in a manner to slightly unbalance the circuit and increase the strength of the bridge signal through amplifier 118. If the weight of the product in the receiving tray 17 is excessively under the "goal" weight, it will still be unable to turn the amplifier 118 on, even with the strengthened signal. Under these conditions power is prevented from flowing through the commutator brush lead 157, i.e., through the underweight memory relay 117, to cause a subsequent reject of the charge. If the product in the tray 17 is not excessively underweight, the amplifier 118 will turn on and the charge will be accepted.

In brief, an overweight charge on any weigherhead 10 occasions a firing of its amplifier 118 and a subsequent rejection of the inacceptable charge; an underweight charge occasions a failure of the amplifier 118 to fire, and a consequent rejection of the inacceptably underweight charge. This occurs in an angular phase of about 15° (FIG. 12), in which the rejection for overweight or underweight value may be occasioned by preventing a carton or other container from reaching a discharge zone, as described in my patent 3,339,651.

Further circuit means involved in the operation in the goaling, underweight and overweight check phases is shown in FIG. 13.

DISCHARGE

As the weigher's rotation continues, the tray 17 enters a new zone of about 90° travel (FIG. 12), wherein the electrical circuitry is again modified by the commutator assembly. In this position the bridge circuit signal is replaced by a fixed commutator signal (through lead 159 (FIG. 7)) of sufficiently high value to turn on the amplifier 118 regardless of the weight of product in the tray 17. The commutator assembly now directs high power to the vibratory feeder 26, causing rapid discharge of the weighted product to a container which has been positioned beneath the tray's discharge point, or not to a container in the event of overweight or underweight. There follows a stabilizing period of about 25°, as shown in FIG. 12, which phase is not germane to the invention, in which the tray 17 is permitted to come to non-vibrating condition, preparatory to the zeroing operation.

ZEROING

As the rotation of each weigher head 10 continues, its tray enters another phase, of about 10° extent, in which the electrical circuits are returned to a state similar to that which existed in the goaling range. The condition is the same as is depicted in FIG. 9, but, in addition, the master weight 81 is (FIGS. 2 and 2A) mechanically raised off the scale beam 22, in the manner described above. There being no product in the receiving tray 17 and no master weight to counterpoise the scale beam 22, there may still be a residue of product left in the tray 17.

If this residue is excessive, the bridge signal at transformer 153 will turn on the amplifier 118, and thus power is directed through commutator brush lead 157 and relay agencies (not shown) to one of the pair of zeroing solenoids 123, 124 (FIGS. 5 and 6). The armature pin 125 of each such solenoid is so positioned that, when energized, the pin will shift radially to a position (FIGS. 5 and 6) to be engaged by a friction wheel 133 of the zeroing potentiometer 120 of the head 10 in question, causing adjustment and rebalancing of the bridge circuit for this particular position of the shadow clip 100. If the residue is removed, the amplifier 118 will not turn on. Under this condition, the opposite solenoid of the pair 123, 124 causes adjustment of the zeroing potentiometer 120 in the opposite rotative direction, causing a rebalancing of the bridge circuit 136 at this new shadow clip position.

The self-zeroing operation follows the discharge and stabilizing phases, described above, and the circuitry is in reference to commutator members 109A–114A, 109B–114B and 109C–114C (FIG. 9), exactly the same as in the goaling phase shown in FIG. 9, although different commutation members are of course employed. Zeroing is also effective to compensate for (a) air pressure on the trays 17 due to their motion, (b) changes in the power supply, and (c) drifts in the characteristics of the photocells 98, 99 or amplifiers 118.

Further rotation of the weigher 10 brings its receiving tray 17 underneath the product stream and a new cycle starting with "Trim-Off" begins.

ZEROING WEIGHT SHIFT

As illustrated in FIG. 11A, commutation is available to put an additional manual rheostat 160 of high resistance value in the bridge circuit 136, in a manner to slightly unbalance the circuit in either direction to reduce or increase the strength of the bridge signal. The zeroing potentiometer 120 will, as a result, be adjusted in a direction to compensate for this externally applied unbalance. Since this externally applied unbalance occurs only in the zero phase, weight checks in all other areas are affected, being assessed either heavier or lighter depending on which direction the external unbalance is electrically applied.

To this end the armature 161 of rheostat 160 is adjustable to contact on half of its winding in circuit with a special commutator segment of 109X (FIG. 11A) and the other half in circuit with another segment 109Y, the respective brushes 114A and 114C contacting these segments being wired to amplifier 118, as previously described.

An instance of the utility of this optional feature arises when it is desired to run objects, such as paper clips, which may vary in weight (for example, due to varying mil size) and still be able to carton a given number per discharge. Other instances are in obtaining a discharge of product which will give a fuller carton, in adjusting for individual different product weights (viz., string beans, Brussels sprouts, etc.) in order to avoid excessive overweight and waste.

FIG. 13 shows circuit provisions involved in the goaling, zeroing, overweight and underweight check phases.

A goaling relay 164 connected to power lead 139 is wired to a segment 109a of the commutator, which a rotary brush 114a periodically contacts, this brush passing voltage from lead 157 through the relay 164 to lead 139. Normally open and closed contacts 164″ and 164′ of the relay are series connected respectively with low goal solenoid 128 and high goal solenoid 129 across the power lines 138, 139.

A pair of further commutator segments 109b, 109c of the same level as segment 109a are successively contacted by the brush 114a. Segment 109b supplies power to yet another segment 109d at a different level contacted by a brush 114d connected between overweight check relay 116 and its contact 116′; and upon contact of a brush 114e with a segment 109e a circuit is completed across leads 138, 139 from lead 157 to interlock relay 116 through its contact 116′. At some later time in the cycle, brush 114d engages a commutator segment (not shown) to energize a still further relay (not shown) and thereby complete an overweight reject signal, with the result mentioned above. For the present purpose, the overweight signal may be considered as originating at relay 116, the other commutation means being simply concerned with time delay or memory action.

The underweight check operation involves similar relay circuitry. In the operation thereof, brush 114a contacts segment 109c and through the agency of a segment 109f and brush 114f the underweight relay 117 and its contact 117' are interlocked in the circuit. Further memory commutation, as in the overweight check, results in the ultimate underweight reject signal, which may be considered as originating at relay 117.

As indicated above the zeroing circuit is established in the same way as the goaling circuit, as depicted in FIG. 13. That is, a zero relay 166 is energized from lead 157 through brush 114a and yet another segment 109g; and the "heavy" tray solenoid 123 and "light" tray solenoid 124 are energized or not.

Advantages of the improved electronic weighing structure and circuitry are many. The underweight and overweight ranges are separately adjusted by the two respective rheostats 146 and 149, which are separate from all the rotating chassis 113 but affect each chassis simultaneously.

Weights may optionally be slightly increased or decreased by manipulating the single external potentiometer 160, simultaneously affecting all chassis.

A single amplifier 118 is able to check several different weight levels, rather than requiring multiple amplifier channels which are hard to match. Amplifier 118 operates in determining the trim shut-off point, the goal level, the overweight level, the underweight level, and in the obtaining of a slightly heavy or slightly light zero level.

All of these variable factors, requiring a plurality of electrical evaluations in the commutator-controlled circuitry, are balanced as against one another and a zero base value by the use of a single light-responsive photoelectric device, and not a multiplicity of individual such devices whose evaluations would be extremely difficult, if not impossible, to balance mutually.

Photo-cell drift due to age and/or temperature change is largely compensated for by the opposed cells 98, 99 in the balanced-bridge circuit. The self-zeroing characteristic compensates for any unbalancing not compensated for by the opposed cells.

The trim shut-off point is independent of the overweight check point; and zeroing and goal checks are performed through the same circuit components, assuring that the weight of the trimmed charge is accurately checked against the master weight 81. The influence of varying characteristics in different electrical components has been eliminated by using the same components for zeroing and goal check.

The equipment has the ability to operate in a humid atmosphere, which electrical contacts cannot do accurately since moisture is conductive and electrolytically corrosive; and there is no contact fouling from arcing, corrosion or dusty atmosphere. Similary, there is no false weight level due to (a) electrical contacts retaining a bend when pressure is applied to make them operate, (b) contact films requiring mechanical pressure to break down before allowing conduction, and (c) contact deposits or craters caused from arcing. All of these conditions cause variations in the scale beam position at which contact is electrically completed. All circuits are plug-in type, without need for precise adjustment as with contacts; and an overlap of overweight, underweight and goal points is not possible through misadjustment, as it is using electrical contacts.

What is claimed is:

1. Electrically controlled weighing equipment, comprising a plurality of traveling weigher heads, each of said heads having a scale beam which supports a product receiving and discharging weighing receptacle and is shifted under the influence of the latter and its content in a weighing operation in travel, a masking member, and a photo-sensitive unit having at least one photo-sensitive member responsive to impingement by radiant energy from a source to forward a variable voltage proportional to the degree of its impingement, one of said members moving with said scale beam relative to the other member, said photo-sensitive member being variably masked by said masking member in response to the scale beam shift to forward said variable voltage, and circuitry including electrical components to which said photo-sensitive member is electrically connected, through which circuitry said components are variably conditioned electrically during travel of the weigher heads to reflect an overweight or underweight of the receptacle content, and to institute at least one automatic operation of checking the accuracy of said weighing operation, the reflection as to overweight or underweight being in response to said variable voltage.

2. The equipment of claim 1, in which said circuitry includes electrical bridge and commutator means having plural potentiometers variably energized electrically under said variable voltage.

3. The equipment of claim 1, in which each head has means to vibrate the receptacle thereof during travel at one rate for a trim-off of product therefrom under control of said photosensitive unit and said circuitry and at a more violent rate for a later final discharge of weighed product.

4. Electrically controlled weighing equipment, comprising a plurality of traveling weigher heads, each of said heads having a scale beam which supports a product receiving and discharging weighing receptacle and is shifted under the influence of the latter and its content in a weighing operation in travel, a system of leaf springs resiliently sustaining said scale beam for such shift, a masking member, and a photo-sensitive unit having at least one photo-sensitive member responsive to impingement by radiant energy from a source to forward a variable voltage proportional to the degree of its impingement, one of said members moving with said scale beam relative to the other member, said photo-sensitive member being variable masked by said masking member in response to the scale beam shift to forward said variable voltage, and circuitry including electrical components to which said photo-sensitive member is electrically connected, through which circuitry said components are variably conditioned electrically during travel of the weigher heads to reflect an overweight or underweight of the receptacle content, and to institute at least one automatic operation of checking the accuracy of said weighing operation, the reflection as to overweight or underweight being in response to said variable voltage.

5. The equipment of claim 4, in which said circuitry includes electrical bridge and commutator means having plural potentiometers variably energized electrically under said variable voltage.

6. The equipment of claim 4, in which each head has means to vibrate the receptacle thereof during travel at one rate for a trim-off of product therefrom under control of said photosensitive unit and said circuitry and at a more violent rate for a later final discharge of weighed product, said head having leaf spring means supporting said scale beam for the shift of the latter, said beam being provided with a master weight removable therefrom and the head having means periodically operable to remove the master weight in a zeroing phase in the rotative weighing cycle, in which phase an operational charactereristic of the head is altered.

7. Electrically controlled weighing equipment, comprising a plurality of traveling weigher heads, each of said heads having a scale beam which supports a product receiving and discharging weighing receptacle and is shifted under the influence of the latter and its content in a weighing operation in travel, a masking member shiftable with said beam, a light source and a photo-sensitive unit, said units each including a pair of photo-sensitive members variably masked inversely of one another in response to the shift of said masking member, thus to forward a variable voltage, and circuitry including electrical components to which said photo-sensitive members are electrically connected to variably condition said components electrically during travel of the weigher heads, thus to reflect an overweight or underweight of the receptacle content, and to institute at least one automatic operation of checking the accuracy of the weighing operation, the reflection as to overweight or underweight being in response to a different degree of masking of said photo-sensitive members.

8. The equipment of claim 7, in which each head has means to vibrate the receptacle thereof during travel at one rate for a trim-off of product therefrom under control of said photo-sensitive unit and said circuitry and at a more violent rate for a later final discharge of weighed product, said head having leaf spring means supporting said scale beam for the shift of the latter, said beam being provided with a master weight removable therefrom and the head having means periodically operable to remove the master weight in a zeroing phase in the rotative weighing cycle, in which phase an operational characteristic of the head is altered.

9. The equipment of claim 7, in which said circuitry includes a bridge sub-circuit, opposite legs of which are electrically supplied by the respective photo-sensitive members, and means operated electrically in response to a difference in said voltages of said photo-sensitive members.

10. The equipment of claim 7, in which said circuitry includes electrical bridge and commutator means having plural potentiometers variably energized electrically under said variable voltage.

11. The equipment of claim 7, in which each head has means to vibrate the receptacle thereof during travel at one rate for a trim-off of product therefrom under control of said photosensitive unit and said circuitry and at a more violent rate for a later final discharge of weighed product.

12. The equipment of claim 11, in which said circuitry comprises means controlled by said photo-sensitive unit to periodically initiate, or fail to initiate a signal indicating an overweight or an underweight of product in said weighing receptacles, prior to discharging the product, and memory relay or equivalent means in said circuitry applying said signal to package control means, in a predeterminedly later phase of the weighing cycle than the signalling phase, whereby overweights and underweights of product are not packaged.

13. The equipment of claim 11, in which said circuitry comprises means controlled by said photo-sensitive unit to periodically initiate, or fail to initiate, successive signals respectively indicating an overweight or an underweight of product in said weighing receptacles, prior to discharging the product, and memory relay or equivalent means in said circuitry applying said signals to package control means, in a predeterminedly later phase of the weighing cycle than the signalling phase, whereby overweights and underweights of product are not packaged.

14. The equipment of claim 11, in which said circuitry includes a bridge sub-circuit, opposite legs of which are electrically supplied by the respective photo-sensitive members, and means operated electrically in response to a difference in said voltages of said photo sensitive members.

15. The equipment of claim 14, in which said circuitry comprises means controlled by said photo-sensitive unit to periodically initiate, or fail to initiate, successive signals respectively indicating an overweight or an underweight of product in said weighing receptacles, prior to discharging the product, and memory relay or equivalent means in said circuitry applying said signals to package control means, in a predeterminedly later phase of the weighing cycle than the signalling phase, whereby overweights and underweights of product are not packaged, said signal applying means comprising separate and individually adjustable overweight and underweight resistance devices, and means to periodically commutate said resistance devices into the bridge circuit.

16. The equipment of claim 11, in which said circuitry includes a bridge sub-circuit, opposite legs of which are electrically supplied by the respective photo-sensitive members, and means operated electrically in response to a difference in said voltages of said photo-sensitive members, said last named means comprising an electrical signal originating device, and an electrical connection between said device and a component of said circuitry to variably condition that component in response to a signal or lack of signal, from said device.

17. The equipment of claim 16, in which said last named component of the circuitry is a potentiometer, and solenoid means periodically operating said potentiometer, in the travel of the weigher head to adjust the resistance of said potentiometer.

18. The equipment of claim 17, and further comprising manually operable rheostat or like means electrically connected in said circuitry with said bridge sub-circuit to alter an operational characteristic of the weigher head in regard to an underweight or overweight action of the equipment at said final discharge of the weighed product.

19. The equipment of claim 11, in which said circuitry includes a bridge sub-circuit, opposite legs of which are electrically supplied by the respective photo-sensitive members, and means operated electrically in response to a difference in said voltages of said photo-sensitive members, said last named means comprising an electrical signal originating device connected across the legs of the bridge circuit, and an electrical connection between said device and a component of said circuitry to variably condition that component in response to a signal, or lack of signal, from said device.

20. The equipment of claim 19, in which said last named component of the circuitry is a potentiometer, and solenoid means periodically operating said potentiometer, under signal or lack of signal from said device, in the travel of the weigher head to adjust the resistance of said potentiometer.

21. The equipment of claim 20, and further comprising manually operable rheostat or like means electrically connected in said circuitry with said bridge sub-circuit to alter an operational characteristic of the weigher head in regard to an underweight or overweight action of the equipment at said final discharge of the weighed product.

22. The equipment of claim 21, and further manually operable rheostat or like means in said circuitry to provide an adjustable shift of the overall weight responsivity of the equipment as a whole.

References Cited
UNITED STATES PATENTS

| | | | |
|---|---|---|---|
| 2,901,209 | 8/1959 | Bardy et al. | 177—80 X |
| 3,118,068 | 1/1964 | Duchene et al. | |
| 3,156,311 | 11/1964 | Olofsson et al. | 177—55 |
| 3,198,271 | 8/1965 | Good | 177—45 |

STEPHEN J. TOMSKY, Primary Examiner

G. H. MILLER, Jr., Assistant Examiner

U.S. Cl. X.R.

177—80, 210